United States Patent
Gaal (10) Patent No.: US 7,590,169 B2
(45) Date of Patent: Sep. 15, 2009

(54) MULTIPATH INTERFERENCE REDUCTION ON PILOT ESTIMATION WITH LEGACY SYSTEM INTEROPERABILITY

(75) Inventor: Peter Gaal, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 603 days.

(21) Appl. No.: 11/349,388

(22) Filed: Feb. 6, 2006

(65) Prior Publication Data

US 2006/0227857 A1 Oct. 12, 2006

Related U.S. Application Data

(60) Provisional application No. 60/650,939, filed on Feb. 7, 2005.

(51) Int. Cl.
H04L 5/16 (2006.01)
(52) U.S. Cl. .................. 375/220; 375/140; 375/148
(58) Field of Classification Search .................. 375/148, 375/260, 219, 220, 222; 370/208–210
See application file for complete search history.

(56) References Cited

U.S. PATENT DOCUMENTS

| | | | |
|---|---|---|---|
| 4,901,307 A | 2/1990 | Gilhousen et al. | |
| 5,103,459 A | 4/1992 | Gilhousen et al. | |
| 7,203,245 B1* | 4/2007 | Murphy | 375/260 |
| 2001/0047424 A1* | 11/2001 | Alastalo et al. | 709/236 |
| 2003/0165131 A1 | 9/2003 | Liang et al. | |
| 2005/0094613 A1* | 5/2005 | Cho et al. | 370/343 |

FOREIGN PATENT DOCUMENTS

WO WO 0147200 6/2001

* cited by examiner

*Primary Examiner*—Emmanuel Bayard
(74) *Attorney, Agent, or Firm*—Kenneth K. Vu; Larry J. Moskowitz (57) ABSTRACT

System, base station and method for supporting frequency domain equalization for frequency domain equalization-capable mobile stations and supporting improved channel estimation for both time domain and frequency domain equalization-capable mobile stations on the forward link without the necessity of modifications to an air-interface specification of a legacy communication system. A first signal sequence is generated according to a first format and an offset vector is also generated. The first signal sequence and the offset vector are combined to form a second signal sequence according to a second format. The second signal sequence of said second format supports frequency domain equalization in one or more frequency domain-capable mobile stations. The second signal sequence maintains compatibility with one or more legacy mobile stations.

23 Claims, 8 Drawing Sheets

MULTIPATH INTERFERENCE REDUCTION ON PILOT ESTIMATION WITH LEGACY SYSTEM INTEROPERABILITY

CLAIM OF PRIORITY UNDER 35 U.S.C. §119

The present Application for Patent claims priority to Provisional Application No. 60/650,939, entitled "Reducing the Impact of Multipath Interference on Pilot Estimation" filed Feb. 7, 2005, and assigned to the assignee hereof and hereby expressly incorporated by reference herein.

BACKGROUND

1. Field

The present invention relates to wireless communication systems generally and, specifically, to methods and apparatus for reducing the impact of multipath interference on pilot estimation.

2. Background

In a wireless radiotelephone communication system, many users communicate over a wireless channel. The use of code division multiple access (CDMA) modulation techniques is one of several techniques for facilitating communications in which a large number of system users are present. Other multiple access communication system techniques, such as time division multiple access (TDMA) and frequency division multiple access (FDMA) are known in the art. However, the spread spectrum modulation technique of CDMA has significant advantages over these modulation techniques for multiple access communication systems.

The CDMA technique has many advantages. An exemplary CDMA system is described in U.S. Pat. No. 4,901,307, entitled "Spread Spectrum Multiple Access Communication System Using Satellite Or Terrestrial Repeaters", issued Feb. 13, 1990, assigned to the assignee of the present invention, and incorporated herein by reference.

An exemplary CDMA system is further described in U.S. Pat. No. 5,103,459, entitled "System And Method For Generating Signal Waveforms In A CDMA Cellular Telephone System", issued Apr. 7, 1992, assigned to the assignee of the present invention, and incorporated herein by reference.

In a relatively noise-free data communication system, when data is transmitted over a communication channel by means of a linear modulation scheme, for example by using Quadrature Phase Shift Keying ("QPSK"), the number of detectable-levels that the channel can support is essentially limited by Inter Symbol Interference ("ISI"). ISI arises because of the "spreading" of a transmitted symbol pulse due to the dispersive nature of the channel, which results in an overlap of adjacent symbol pulses. Stated differently, ISI occurs when a portion of a signal representative of one transmitted pulse interferes with a different portion of the signal representative of a different transmitted pulse.

The adverse effects of ISI are more pronounced where the signal to noise ratio is high and the channel is relatively noise-free. In such channels, which are typically more important in data (as opposed to voice) communications, the presence of ISI greatly degrades performance of the communications system.

A common cause of ISI is the "multipath" phenomenon. Simply stated, multipath refers to interference caused by the reception of the same signal over multiple paths. Depending on the environment surrounding the mobile station (also called the "subscriber unit") such as the existence of buildings or mountains, copies of the transmitted symbol pulses may arrive at the receiver at different times. As such, components of neighboring symbol pulses may interfere constructively or destructively.

It is generally known that equalization can be used to minimize the effects of ISI. Equalization involves altering a signal so that it may be more easily recognized at the receiver. A signal may be altered at the transmitter so that the influence of the channel on the signal will yield a signal capable of being properly recognized at the receiver. However, transmitter-based equalization is difficult since the transmitter must have a priori knowledge of the characteristics of the channel and any changes that may occur to the characteristics of the channel over time.

Equalization may also be performed at the receiver. Receiver-based equalization can use properties of the received signal to adjust equalization parameters. In wireless communications, since the mobile channel is random and time varying, equalizers must track the time varying characteristics of the mobile channel. Equalization attempts to apply a desirable amount of correction to the channel.

Receivers in mobile stations generally benefit from utilization of an equalizer. Conventionally, time domain equalizers have been used but they are in less effective if the mobile station is moving at a velocity greater than 10-20 kilometers-per-hour. Frequency domain equalizers are also known and provide faster channel adaptation capability (improved convergence time). While frequency domain equalizers are desirable for timely convergence and operability over increased mobile station velocities, frequency domain equalizers greatly benefit from the use of a specific form of a transmitted signal that is not present in a conventional CDMA forward link ("FL") channel. Such specific formats could be attained in 'unconventional' CDMA forward link channels by inserting cyclic prefix or 'unique word' in the transmitted signal.

In a deployed communication system, a substantial alteration to the forward link channel would render obsolete the existing or "legacy" mobile stations that are not specifically configured to interact with the substantially altered forward link signal. Therefore, since base stations transmit to a variety of mobile stations, the transmitted or forward link FL signal must be compatible with existing or legacy mobile stations while also providing a signal configured to facilitate equalization in mobile stations that include frequency domain equalizers.

Therefore, there is a need to provide a transmitted signal that accommodates both operation of the legacy mobile stations while supporting the incorporation and operation of equalizers in equalized mobile stations.

SUMMARY

Aspects of the invention provide techniques for supporting frequency domain equalization for frequency domain equalization-capable mobile stations on the forward link without the necessity of modifications to an air-interface specification of a legacy communication system. In one embodiment of the present invention, a method for maintaining interoperation of one or more legacy mobile stations operable according to a first format while supporting one or more frequency domain-capable mobile stations operable according to a second format is provided. A first signal sequence is generated according to a first format and an offset vector is also generated. The first signal sequence and the offset vector are combined to form a second signal sequence according to a second format. The second signal sequence of said second format supports frequency domain equalization in one or more frequency domain-capable mobile stations. The second signal sequence maintains compatibility with one or more legacy mobile stations.

In another embodiment of the present invention, a base station including an encoder for encoding a plurality of message data bits into a plurality of code symbols is provided. The base station further includes a signal modifier configured to generate a first signal sequence according to a first format and generate an offset vector and a summer for combining said first signal sequence with said offset vector. The combination forms a second signal sequence according to a second format with the second signal sequence of said second format supporting frequency domain equalization in one or more frequency domain-capable mobile stations. The second signal sequence maintains compatibility with one or more legacy mobile stations.

In yet another embodiment of the present invention, a wireless communication system is provided. The wireless communication system includes one or more non-frequency domain equalized-capable mobile stations configured to operate according to a first format and second one or more frequency domain equalization-capable: mobile stations configured to operate according to a second format. The wireless communication system is further configured to include a base station configured for maintaining interoperation of one or more non-frequency domain equalization-capable mobile stations operable according to a first format while supporting one or more frequency domain-capable mobile stations operable according to a second format.

In yet a further embodiment of the present invention, a system for maintaining interoperation of one or more legacy mobile stations operable according to a first format while supporting one or more frequency domain-capable mobile stations operable according to a second format is provided. The system includes a means for generating a first signal sequence according to a first format and a means for generating an offset vector. The system further includes a means for combining said first signal sequence with said offset vector to form a second signal sequence according to a second format, said second signal sequence of said second format supporting frequency domain equalization in one or more frequency domain-capable mobile stations, said second signal sequence maintaining compatibility with one or more legacy mobile stations.

DETAILED DESCRIPTION

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

The following discussion develops the exemplary embodiments for supporting frequency domain equalization in mobile stations by first discussing a spread-spectrum wireless communication system. The use of frequency domain equalization in a spread-spectrum wireless communication system is discussed. Then components of an embodiment of a base station are shown in relation to providing a frequency domain equalization. Included in the specification relating to frequency domain equalization are illustrations and mathematical derivations for modifying the conventional forward link signal to accommodate frequency domain equalization. Conceptual and implementation block diagrams are discussed.

Note that the exemplary embodiment is provided as an exemplar throughout this discussion; however, alternate embodiments may incorporate various aspects without departing from the scope of the present invention.

The exemplary embodiment employs a spread-spectrum wireless communication system. Wireless communication systems are widely deployed to provide various types of communication such as voice, data, and so on. These systems may be based on CDMA, TDMA, or some other modulation techniques. A CDMA system provides certain advantages over other types of systems, including increased system capacity.

A system may be designed to support one or more standards such as the "TIA/EIA/IS-95-B Mobile Station-Base Station Compatibility Standard for Dual-Mode Wideband Spread Spectrum Cellular System" referred to herein as the IS-95 standard, the standard offered by a consortium named "3rd Generation Partnership Project" referred to herein as 3GPP, and embodied in a set of documents including Document Nos. 3G TS 25.211, 3G TS 25.212, 3G TS 25.213, and 3G TS 25.214, 3G TS 25.302, referred to herein as the W-CDMA standard, the standard offered by a consortium named "3rd Generation Partnership Project 2" referred to herein as 3GPP2, and TR-45.5 referred to herein as the cdma2000 standard, formerly called IS-2000 MC. The standards cited hereinabove are hereby expressly incorporated herein by reference.

Each standard specifically defines the processing of data for transmission from base station to mobile station, and vice versa. As an exemplary embodiment, the following discussion considers a spread-spectrum communication system consistent with the CDMA2000 standard of protocols. Alternate embodiments may incorporate another standard. Still other embodiments may apply the compression methods disclosed herein to other types of data processing systems.

Figure 1:
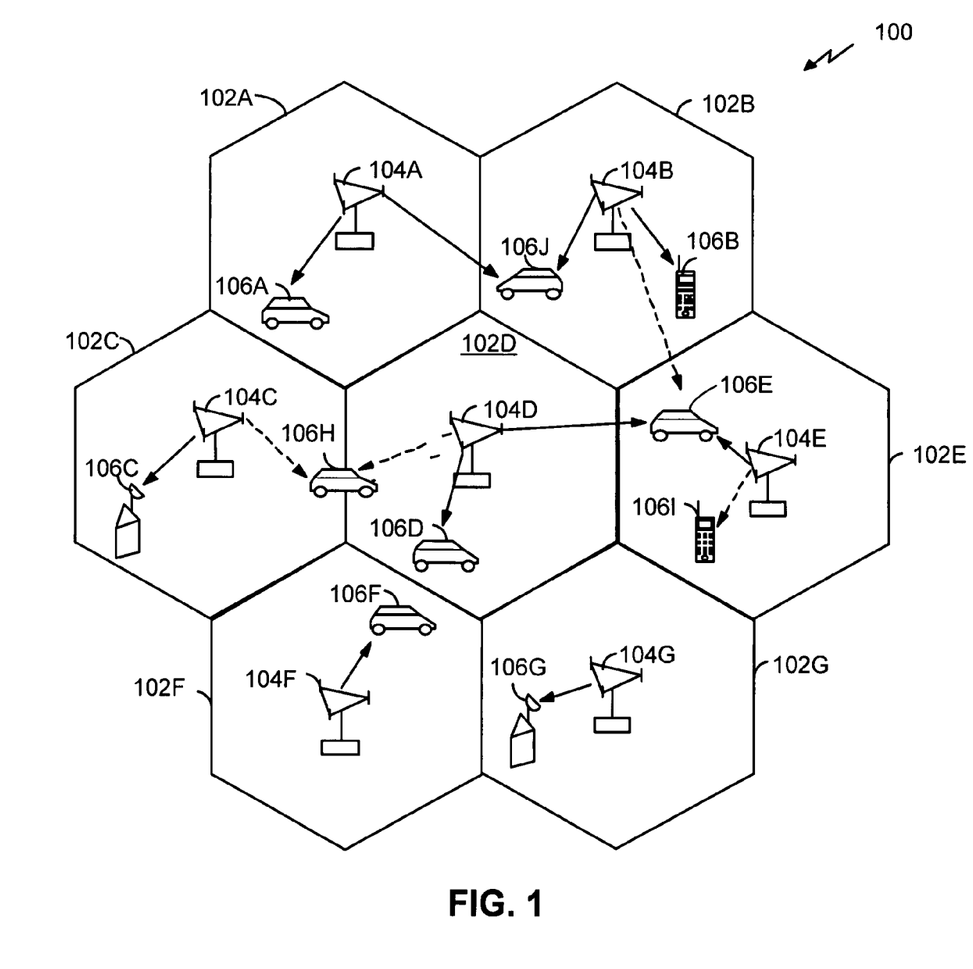
FIG. 1 is a diagram of a spread spectrum communication system that supports a number of users.

FIG. 1 serves as an example of a communications system 100 that supports a number of users and is capable of implementing at least some aspects of the embodiments discussed herein. Any of a variety of algorithms and methods may be used to schedule transmissions in system 100. System 100 provides communication for a number of cells 102A-102G, each of which is serviced by a corresponding base station 104A-104G, respectively. In the exemplary embodiment, some of the base stations 104 have multiple receive antennas and others have only one receive antenna. Similarly, some of the base stations 104 have multiple transmit antennas, and others have single transmit antennas. There are no restrictions on the combinations of transmit antennas and receive antennas. Therefore, it is possible for a base station 104 to have multiple transmit antennas and a single receive antenna, or to have multiple receive antennas and a single transmit antenna, or to have both single and multiple transmit and receive antennas.

Terminals 106 in the coverage area may be fixed (i.e., stationary) or mobile. As shown in FIG. 1, various terminals 106 are dispersed throughout the system. Each terminal 106 communicates with at least one and possibly more base stations 104 on the downlink (also called the "forward link" or "FL") and uplink (also called the "reverse link" or "RL") at any given moment depending on, for example, whether soft handoff is employed or whether the terminal is designed and operated to (concurrently or sequentially) receive multiple transmissions from multiple base stations. Soft handoff in CDMA communications systems is well known in the art and is described in detail in U.S. Pat. No. 5,101,501, entitled "Method and system for providing a Soft Handoff in a CDMA Cellular Telephone System", which is assigned to the assignee of the present invention.

The forward link or downlink refers to transmission from the base station 104 to the terminal 106, and the reverse link or uplink refers to transmission from the terminal 106 to the base station 104. In the exemplary embodiment, some of terminals 106 have multiple receive antennas and others have only one receive antenna. In FIG. 1, base station 104A transmits data to terminals 106A and 106J on the downlink, base station 104B transmits data to terminals 106B and 106J, base station 104C transmits data to terminal 106C, and so on.

Figure 2:
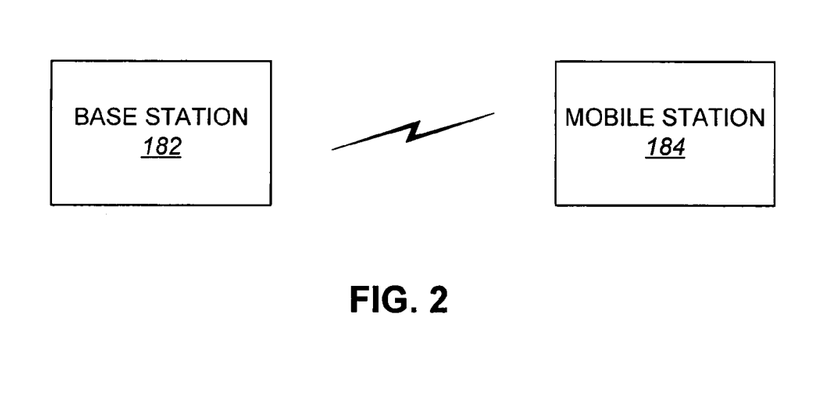
FIG. 2 is a block diagram of a base station and a mobile station in a communication system.

FIG. 2 is a block diagram of the base station 182 and mobile station 184 in a communications system. A base station 182 is in wireless communications with a terminal herein identified as a mobile station 184. As mentioned above, the base station 182 transmits signals to mobile stations 184 that receive the signals. In addition, mobile stations 184 may also transmit signals to the base station 182.

Figure 3:
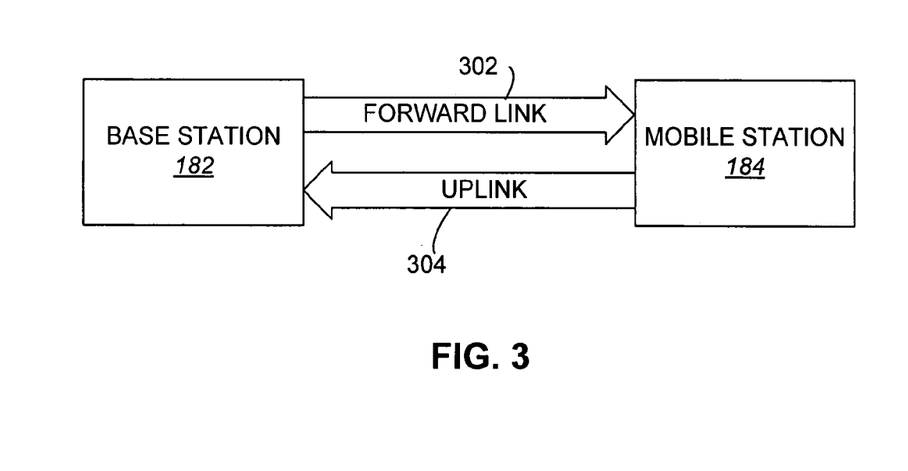
FIG. 3 is a block diagram of illustrating the downlink and the uplink between the base station and the mobile station, in accordance with an embodiment of the present invention.

FIG. 3 is a block diagram of the base station 182 and mobile station 184 illustrating the forward link 302 and the reverse link 304. The forward link 302 refers to transmissions from the base station 182 to the mobile station 184, and the reverse link 304 refers to transmissions from the mobile station 184 to the base station 182.

Figure 4:
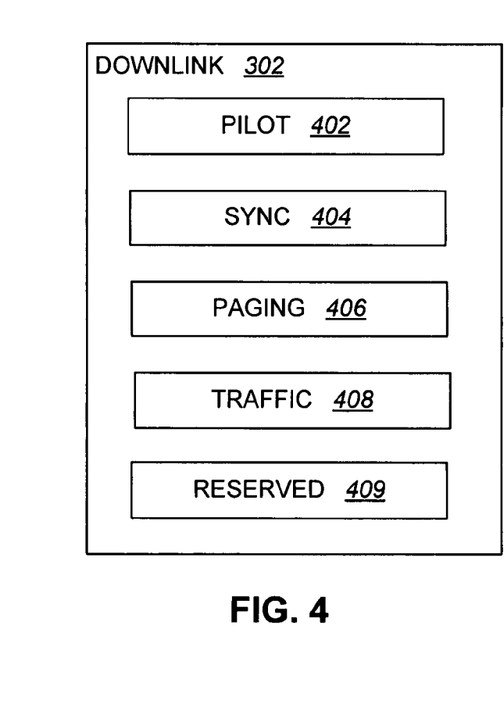
FIG. 4 is a block diagram of the channels in the downlink or forward link, in accordance with an embodiment of the present invention.

FIG. 4 is a block diagram of the channels in an embodiment of the forward link 302. The forward link 302 includes a pilot channel 402, a sync channel 404, a paging channel 406, a traffic channel 408, and reserved channel(s) 409. The forward link or forward link 302 illustrated is only one possible embodiment of a forward link and it will be appreciated that other channels may be added or removed from the forward link 302 and also that multiple instances of the same channel type may be used simultaneously.

Although not illustrated, the reverse link 304 also includes various channels. The base station 182 may also include frequency domain equalization, however, the presently illustrated embodiments do not further describe equalization in the reverse link 304 but the systems and methods described herein may be also applied to facilitate frequency domain equalization in the base station 182.

Under one CDMA standard described in the Telecommunications Industry Association's TIA/EIA/IS-95-A Mobile Stations-Base Station Compatibility Standard for Dual-Mode Wideband Spread Spectrum Cellular System, each base station 182 transmits pilot 402, sync 404, paging 406, forward traffic 408 and/or specific reserved 409 channels to its users. The pilot channel 402 is an unmodulated, direct-sequence spread spectrum signal transmitted continuously by each base station 182. The pilot channel 402 allows each user to acquire the timing of the channels transmitted by the base station 182, and provides a phase reference for coherent demodulation. The pilot channel 402 also provides a means for signal strength comparisons between base stations 182 to determine when to hand off between base stations 182 (such as when moving between cells).

Figure 5:
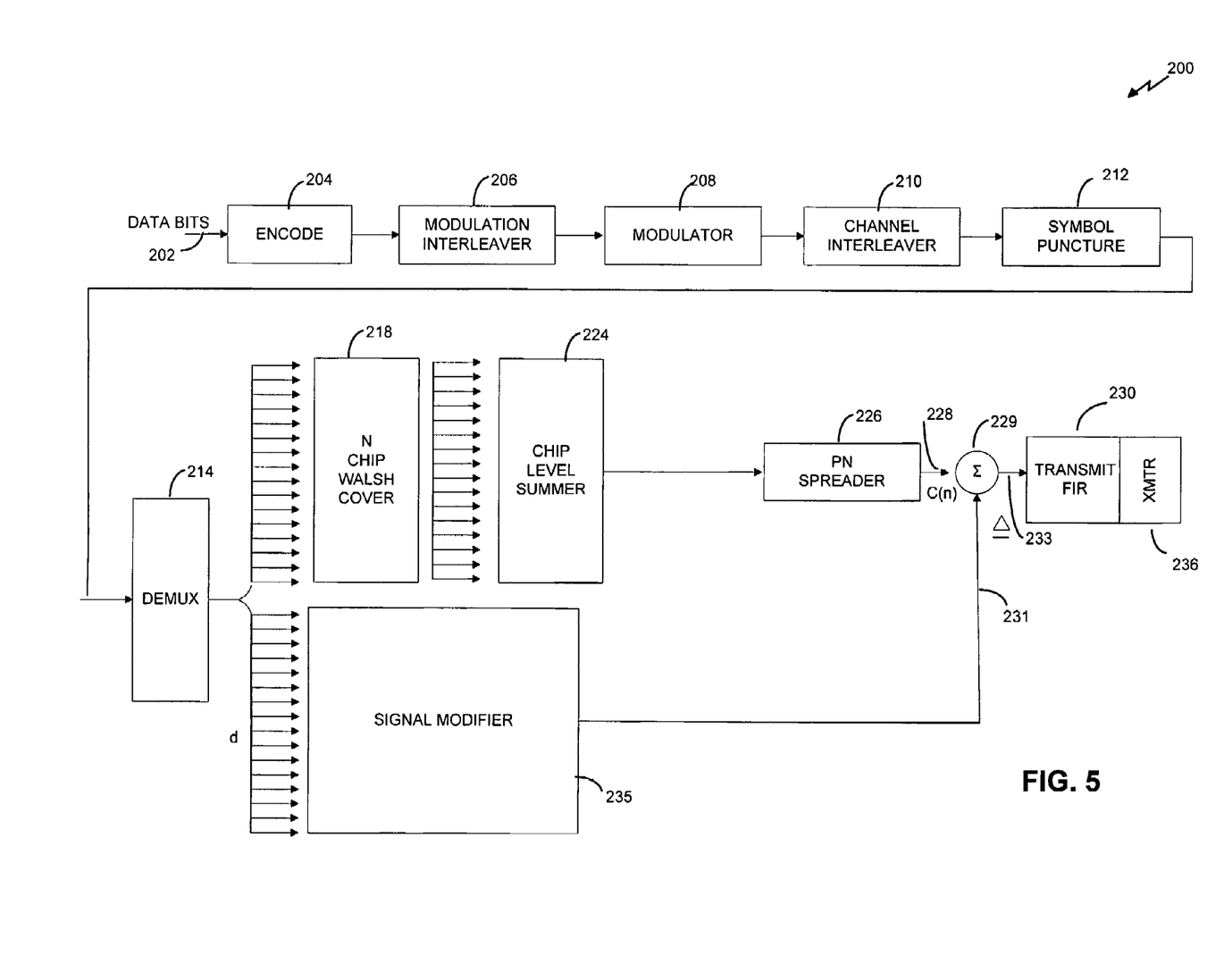
FIG. 5 is a block diagram of a base station, in accordance with an embodiment of the present invention.

FIG. 5 illustrates an example of generation of a spread spectrum chip sequence c(n) 228 from input data bits 202 which is combined with an offset vector $°\underline{\Delta}$ 231 to form a spread spectrum offset chip sequence 235. Input data bits 202 are also referred to as "message data bits" or the "original message" in the present application. The exemplary system 200 shown in FIG. 5 constitutes part of a transmitter which may generally reside in a base station, gateway, or satellite repeater, as the transmission is taking place in a forward link. In the example shown in FIG. 5, input data bits 202 contain the information or message of interest to be transmitted from a base station 182 (FIG. 2) to a receiver in a mobile station 184 (FIG. 2) across a communication channel.

Message data bits 202 are first inputted to an encoder 204. Encoder 204 can be an FEC ("Forward Error Correction") encoder utilized to introduce redundancy in the message data bits 202 using convolutional coding techniques known in the art. The redundancy introduced by encoder 204 enables the receiver to correct some detection errors without the need to increase transmission power. Output of encoder 204 is generally referred to as "code symbols." Generally, a single message data bit inputted to encoder 204 corresponds to several code symbols outputted from encoder 204.

In an alternative approach, encoder 204 performs a "source encoding" function prior to the redundancy encoding discussed above. Source encoding involves performing data compression for efficient representation of input data bits 202 prior to introducing redundancy and the generation of code symbols.

Modulation interleaver 206 receives code symbols from encoder 204 and "interleaves" the code symbols prior to processing by modulator 208. Interleaving is utilized in a transmission system, such as system 200 in FIG. 5, in order to cause potential noise bursts or "deep fades" to appear random (i.e. independent) rather than correlated at the receiver. Interleaving is also utilized to ensure that, in the presence of noise bursts or deep fades, important bits in a block of source data are not corrupted at the same time. Since error control codes are generally designed to protect against channel errors that may occur randomly, by scrambling the time order or source data bits, interleavers ensure that error control coding remains effective in detection and cancellation of errors. In the exemplary system 200 in FIG. 5, interleaver 206 may be a block interleaver or a convolutional interleaver, which are both known in the art.

The interleaved code symbols are passed on to modulator 208. In wireless digital communications, a number of different, but related, modulation schemes can be used in modulator 208. For example, Binary Phase Shift Keying (BPSK), Differential Phase Shift Keying (DPSK), Quadrature Phase Shift Keying (QPSK) (including OQPSK and n/4QPSK), and Quadrature Amplitude Modulation (QAM), are digital modulation techniques which can be utilized in modulator 208 to modulate the code symbols generated by modulation interleaver 206. However, modulator 208 is not limited to any specific type of modulator and can be any of the many digital modulators used in wireless communications.

As shown in FIG. 5, modulator 208 passes the modulated signals to channel interleaver 210. An essential feature of a transmission channel is that a transmitted signal is corrupted by a variety of possible mechanisms, such as noise bursts generated by electronic devices. In fact, during modulation by modulator 208, some noise bursts may be introduced by the modulator itself. In order to make noise bursts appear random, channel interleaver 210 is utilized. Channel interleaver 210 modifies the time order of the signals to be transmitted across the channel. Channel interleaver 210 may be a block interleaver or a convolutional interleaver.

In the exemplary system 200, the channel interleaved symbols from interleaver 210 are passed on to symbol puncture element 212. Symbol puncturing is a process by which some of the message symbols are deleted and replaced by desired control symbols. Thus, puncturing is generally used to insert control information, such as power control information, in the source data for proper handling of the communications between the transmitter and the receiver. Although symbol puncturing has a potential for introducing errors in the message or source data received at the receiver, recent techniques minimize or eliminate such errors. In the exemplary system 200, symbol puncture element 212 is used for inserting various control symbols, such as power control symbols and symbols providing reference for time, phase, and signal strength, into the message symbol stream. The control symbols punctured into the message symbols are time division multiplexed into the message symbols.

As shown in FIG. 5, the symbol stream outputted by symbol puncture element 212 is inputted to DEMUX 214. DEMUX 214 is used for demultiplexing the input symbol stream into a number of parallel output symbol streams, $\underline{d}$. In the exemplary system 200 in FIG. 5, DEMUX 214 is a one-to-16 demultiplexer. In other words, 16 parallel symbol streams are outputted at the same time. The reason for needing 16 parallel outputs is that a Walsh function matrix of order 16 is used in N chip Walsh cover 218 in the exemplary system 200. In other embodiments, a Walsh function matrix of order 64 or 128 may be used in which case DEMUX 214 would be a one-to-64 or one-to-128 demultiplexer, respectively. It is noted that, in the exemplary system 200, the 16 parallel outputs of DEMUX 214 can correspond to a single user, or up to 16 different users. When the data symbols inputted to DEMUX 214 correspond to a single user, the input data symbols are first buffered and then outputted in 16 parallel symbol streams, $\underline{d}$ (a.k.a., modulation symbol vector), to N chip Walsh cover 218.

N chip Walsh cover 218 performs Walsh covering (or Walsh modulation) on each of the parallel input symbols, $\underline{d}$ coming from DEMUX 214. As stated above, in the present example N=16, i.e. the Walsh function matrix is a matrix of order 16. However, the value of N is a design choice and N could be 64 or 128. As shown in FIG. 5, DEMUX 214 outputs 16 parallel symbol streams to N chip Walsh cover 218. As discussed earlier, Walsh functions are orthogonal functions which are used to transform each input symbol into a respective sequence of output chips where each sequence of output chips is orthogonal with every other sequence of output chips. Typically, the transformation is performed by multiplying each inputted symbol by a sequence of chips in a particular Walsh function, or by using a more efficient Fast Hadamard Transform (FHT). For each symbol, therefore, a sequence of chips is outputted by N chip Walsh cover 218. The sequence of chips is of length N, which in the present example is 16. Thus, in the exemplary system 200, for each inputted symbol, 16 chips are outputted by N chip Walsh cover 218. In the present application, "original Walsh covered chip sequences" refers to chip sequences outputted by N chip Walsh cover 218 in exemplary system 200.

In CDMA communications, Walsh functions are used in the forward link to separate users (i.e. the subscriber units). As an example, for a given sector (in CDMA, each sector is a subset of a cell), each forward channel is assigned a distinct Walsh function. In other words, communications between a base station and each subscriber unit are coded by a distinct Walsh code sequence. Referring to FIG. 5, each symbol inputted to N chip Walsh cover 218 is multiplied with all the chips in the Walsh code sequence assigned to a particular subscriber unit (e.g., a particular cell phone user). The operation of a Walsh function to convert each symbol into a sequence of chips is also referred to as Walsh "covering."

Typically there is one or more Walsh code sequence assigned to the forward link pilot. Such pilot sequences usually represent 5%-20% of the total transmitted forward link power.

Each of the 16 parallel chip sequences processed by the N chip Walsh cover 218 is outputted to chip level summer 224. Chip level summer 224 is utilized to provide a "vertical sum" of each of the chip sequences outputted by the N chip Walsh cover 218. To explain the "vertical sum" operation of chip level summer 224, a simple example is used where N in the N chip Walsh cover is equal to four (instead of N being equal to 16, which is the case in the exemplary system 200). In this simple example, suppose that the four (generally complex) symbols [a,b,c,d] are the four code symbols which are to be "covered" by the Walsh function matrix of order 4. The Walsh function matrix of order 4 is:

$$\begin{vmatrix} 1 & 1 & 1 & 1 \\ 1 & 0 & 1 & 0 \\ 1 & 1 & 0 & 0 \\ 1 & 0 & 0 & 1 \end{vmatrix}$$

The resulting four output chip sequences, which are obtained by multiplying each Walsh function (i.e. each row in the Walsh function matrix) by each of the input code symbols, are:

Chip sequence (1)=[a, a, a, a]
Chip sequence (2)=[b, −, b, −b]
Chip sequence (3)=[c, c, −c, −c]
Chip sequence (4)=[d, −d, −d, d]
The "vertical sum" of these four chip sequences is obtained by adding the chips in corresponding columns. Thus, the resulting vertical sum is:

[a+b+c+d, a−b+c−d, a+b−c−d, a−b−c+d].

As shown in FIG. 5, the output of chip level summer 224 is provided to PN ("Pseudorandom Noise") spreader 226. By way of background, a PN sequence is a binary sequence that is deterministic but resembles a random binary sequence. As such, a PN sequence has nearly an equal number of 0s and 1s, a very low correlation between shifted versions of the sequence, and a very low cross-correlation between any two different PN sequences. These properties make PN sequences very desirable in wireless digital communications. The output chip sequence of a PN spreader is also referred to as a spread spectrum signal since it has a bandwidth several orders of magnitude greater than the minimum required signal bandwidth. Spread spectrum signals are demodulated at the receiver through cross-correlation with a locally generated version of the PN sequence. Cross-correlation with the correct PN sequence "despreads" the spread spectrum signal and restores the modulated message, whereas cross-correlating a signal by an unintended user results in a very small amount of wideband noise at the receiver output.

An important reason for using a PN spreading technique is its inherent interference rejection capability. Since each base station is assigned a unique PN code, which has a low cross-correlation with the codes assigned to other base stations, the receiver can separate each base station based on their respective codes, even though the bases stations occupy the same frequency spectrum at all times. Since all users are able to share the same spectrum, spread spectrum can eliminate frequency planning, since all cells can use the same frequency channels.

The PN sequence is usually generated using sequential logic. Feedback shift registers consisting of consecutive stages of state memory elements are typically utilized. Binary sequences are shifted through the shift registers in response to clock pulses, and the outputs of the various stages are logically combined and fed back as the input to the first stage. The output of the last stage is the desired PN sequence.

PN spreader 226 impresses a PN sequence on the chips outputted by chip level summer 224 in a manner known in the art. As an example, the modulation by PN spreader 226 can be performed by a modulo-2 addition (i.e. XORing) of each chip outputted by chip level summer 224 with a respective chip in a PN sequence generated by PN spreader 226. The result of the PN spreading performed on the output of chip level summer 224 is output chip sequence c(n) 228.

The general principles of CDMA communication systems, and in particular the general principles for generation of spread spectrum signals for transmission over a communication channel is described in U.S. Pat. No. 4,901,307 entitled "Spread Spectrum Multiple Access Communication System Using Satellite or Terrestrial Repeaters" and assigned to the assignee of the present invention. The disclosure in that patent, i.e. U.S. Pat. No. 4,901,307, is hereby fully incorporated by reference into the present application. Moreover, U.S. Pat. No. 5,103,459 entitled "System and Method for Generating Signal Waveforms in a CDMA Cellular Telephone System" and assigned to the assignee of the present invention, discloses principles related to PN spreading, Walsh covering, and techniques to generate CDMA spread spectrum communication signals. The disclosure in that patent, i.e. U.S. Pat. No. 5,103,459, is also hereby fully incorporated by reference into the present application.

Further, the present invention utilizes time multiplexing of data and various principles related to "high data rate" communication systems, and the present invention can be used in a "high data rate" communication systems, disclosed in U.S. patent application entitled "Method and Apparatus for High Rate Packet Data Transmission" Ser. No. 08/963,386 filed on Nov. 3, 1997, and assigned to the assignee of the present invention. The disclosure in that patent application is also hereby fully incorporated by reference into the present application.

The data symbols inputted to DEMUX 214 and then outputted in, for example, 16 parallel symbol streams, $\underline{d}$, are also passed to a signal modifier 235. The incorporation of signal modifier 235 enables the support of a frequency domain equalizer in the mobile station 184 (FIG. 2) without changes to the CDMA air-interface specification. The signal modifier 235 receives the modulation symbol vector, $\underline{d}$, from the DEMUX 214 and generates an offset vector $\underline{\Delta}$ 231 that is summed at a summer 229 with the output chip sequence c(n) 228. The sum 233 of the modulated symbol vector, $\underline{d}$, and the offset vector $\underline{\Delta}$ is passed on to "transmit FIR" 230 and a transmitter 236. Transmit FIR 230 is typically an FIR filter used for pulse shaping signals prior to their transmission over a communication channel. Transmit FIR 230 is also referred to as a "transmit filter" in the present application. The transmit filter itself typically introduces a certain amount of ISI in the transmitted signal. By the use of appropriate pulse shaping known in the art, the ISI in the transmitted signal can be reduced.

Returning to the signal modifier 235, several embodiments may be configured for supporting frequency domain equalization solutions on the forward link from the base station 182 (FIG. 2) to the mobile station 184 (FIG. 2) without requiring modifications to the CDMA air-interface specification.

In one embodiment of the signal modifier 235, the base station supports frequency domain equalization in the forward link without CDMA air-interface changes by assuming the following: (i) the pilot can be measured with minimal interference from data, for example, through the use of a TDM pilot and appropriate guard times; and (ii) both the data and the pilot (especially the latter) is cyclically wrapped around with an overlap equal to the maximum tolerable delay spread, (i.e., a cyclic prefix similar to that used in OFDM).

The above conditions could be satisfied relatively easily with redesigning the air-interface. Unfortunately, the CDMA2000 (except for DO) structure doesn't easily lend itself to such solutions, at least not in a backward compatible manner. This is mainly because the continuous pilot and possibly the other overhead channels cannot be changed. In order to maintain backward or legacy compatibility of mobile stations, the forward link signal is configured such that (A) The first m chips of every symbol are set to '0'; and (B) there are m equally spaced values (i.e. pilot tones) in the Fourier spectrum of the transmitted signal that are each set to a fixed value known both to the transmitter and to the receiver. The fixed value may be the same for all pilot tones or they may be different. Hereafter, we will assume that the value of each of the m pilot tones is set to $\sqrt{I_{or}/N}$, where N (e.g., 128) is the symbol length used in the Fast Fourier Transform (FFT) block of the mobile station. As mentioned above, other value assignments are also possible. It should be appreciated that the forward link may use a number of different Walsh code lengths at the same time. The basis for such an assumption is that the equalizer processing is performed on, for example, 128-chip symbols. In a sense, the Tx or forward link signal is decomposed into $W_{128}$ constituents, regardless of the actual Walsh code lengths used. Such an approach is workable but it is appreciated that shorter Walsh codes may result in an implemented performance impact.

By way of example and not limitation, the signal modifier 235 of the present embodiment assumes one or more specific numbers which are illustrative and not to be considered limiting. In implementing a signal modifier 235 that is compatible with legacy mobile stations, an exemplary illustration assumes N=128 and m=4 and, for simplicity, the chosen m should divide N. Continuing, the last 2m=8 Walsh codes that are not used for data transfer are reserved but are set in order to achieve the above-objectives that (A) The first m chips of every symbol are set to '0'; and (B) there are m equally spaced values in the Fourier spectrum of the transmitted signal that are each set to $\sqrt{I_{or}/N}$, where N (e.g., 128) is the symbol length used in the equalizer. Such Walsh code reservations may incur an approximate 8/128 or 6% spectrum overhead.

In continuing with describing the present embodiment, the following matrices are defined:

H is the 128×128 Walsh code matrix, where the columns represent the Walsh codes.

$\underline{d}$ is the (128−2m)×1 modulation symbol vector

S is the 128×128 diagonal scrambling matrix, whose diagonal elements represent the short PN code.

$\underline{T}$ is the 128×1 transmit signal, whose elements are the chip ×1 time samples.

It is also appreciated that in one of the CDMA air-interface specifications, namely the CDMA2000 specification, $\underline{T}$ may be determined as:

$$\underline{T} = SH\underline{d}. \quad \text{Eq. (1)}$$

Furthermore, objectives (A) and (B) are both satisfied if an offset vector $\underline{\Delta}$ 231 is identified that satisfies the following condition:

$$G \cdot (\underline{T} + \underline{\Delta}) = \underline{r} \quad \text{Eq. (2)}$$

where $$G = \begin{bmatrix} SH_1 \\ \vdots \\ SH_m \\ M_1 \\ \vdots \\ M_m \end{bmatrix} \quad \text{Eq. (3)}$$

where the $SH_k$ are the kth row of the product matrix SH, and the $M_l$ are the lth row of product matrix FSH, where F is the m×128 submatrix of the FFT transformation matrix, which consists of the rows corresponding to frequencies l·N/m+d (where d could be a sector specific frequency offset used in order to avoid overlapping pilot tones across neighboring base stations or neighboring base station sectors). We can compute the elements of F as:

$$F_{l,n} = \sqrt{1/N} \sum_{k=0}^{N-1} (SH)_{k,n} \cdot \exp\left(-2\pi i \cdot \left(l \cdot \frac{N}{m} + d - 1\right) \cdot \frac{k}{N}\right) \quad \text{Eq. (4)}$$

Referring back to Eq (2), the resulting vector $\underline{r}$ should be such that $\|\underline{r}-\underline{s}\|$ is minimized, where s is the object vector defined as:

$$s_l = \begin{cases} 0 & \text{for } 1 \leq l \leq m \\ \sqrt{1/N} & \text{for } m+1 \leq l < 2m \end{cases} \quad \text{Eq. (5)}$$

We use linear estimation to obtain the best possible $\underline{\Delta}$. For this, we define a diagonal weighting Matrix, W, which controls the permissible SNR degradation in each of the used Walsh channels, and the power overhead in the last 2m unused Walsh channels. We set W as follows:

$$W_{n,n} = \begin{cases} \sqrt{|d_n|} & \text{for } 1 \leq n < N - 2m + 1 \\ 2.5 & \text{for } N - 2m + 1 \leq n < N \end{cases} \quad \text{Eq. (6)}$$

The above assignment ensures that the SNR degradation is even across all Walsh channels regardless of their $E_c/I_{or}$ allocation. Note that if some Walsh channels, such as the pilot need to be protected more (or less) than others, then the corresponding value of W could be reduced (or increased) accordingly. Conversely, the value for other unused Walsh codes could be increased (or decreased).

Define also diagonal 2m-by-2m weighting matrix U, which controls the allowed error $\|\underline{r}-\underline{s}\|$. We set $U_{n,n}=6\cdot10^{-2}$ for $1 \leq n \leq 2m$.

With all the above, we estimate $\underline{\Delta}$ as:

$$\underline{\Delta} = W(Q^TQ+U)^{-1}Q^T\underline{v} \quad \text{Eq. (7)}$$

where Q=GW, and $\underline{v}$ is the 2m×1 'measurement' vector defined as:

$$v_l = \begin{cases} -T_l & \text{for } 1 \leq l \leq m \\ \sqrt{1/N} - (FT)_{(l-m)N/m+d} & \text{for } m+1 \leq l \leq 2m \end{cases} \quad \text{Eq. (8)}$$

Figure 6:
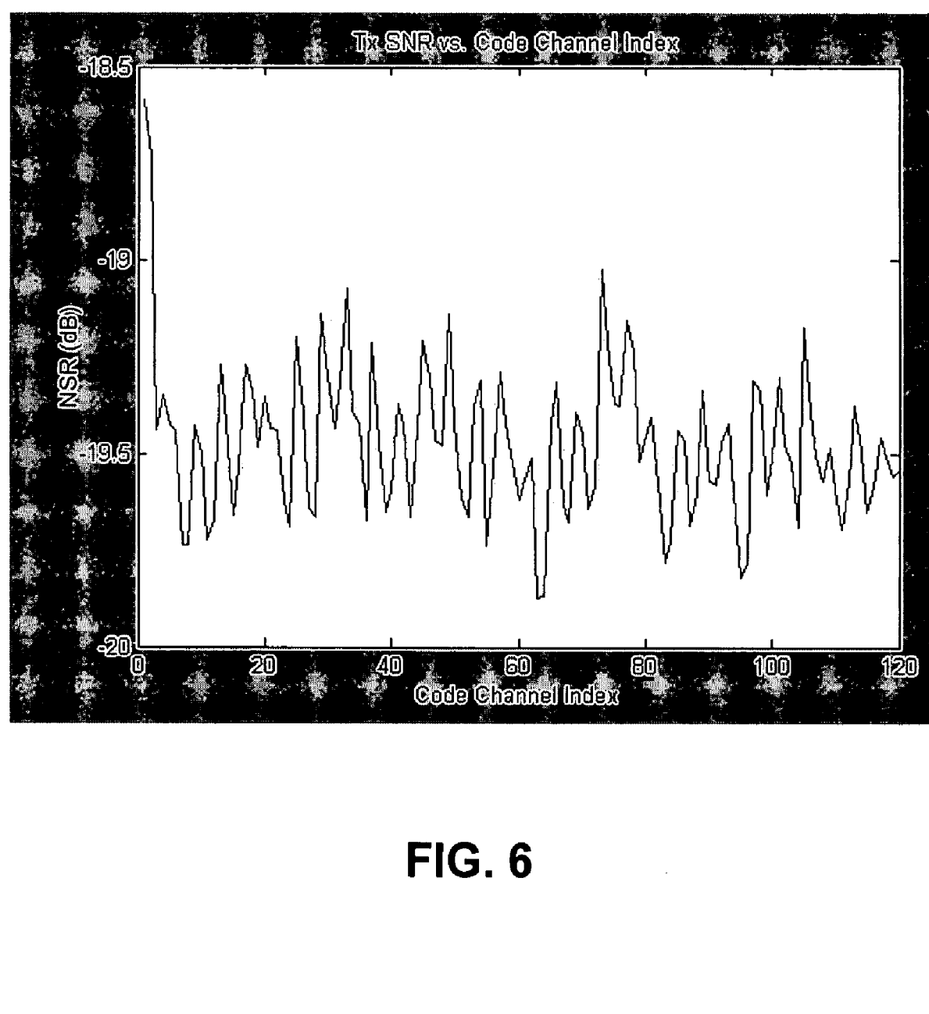
FIGS. 6-10 are plots that illustrate the performance for various transmitter processing schemes.

FIG. 6 illustrates an actual plot of simulation results with the following assumptions:
Pilot $E_c/I_{or}$=−10 dB
Sync $E_c/I_{or}$=−13 dB
Paging $E_c/I_{or}$=−13 dB
Traffic $E_c/I_{or}$ (per traffic Walsh channel)=(1−Pilot−Sync−Paging)/(N−3−2m)
Simulation run: 5000 symbols The simulation results are illustrated with reference to FIGS. 6-8. FIG. 6 illustrates the 'Transmit' Noise-to-Signal Ratio (NSR) in each forward link code channel. Note that the degradation represented by this NSR is relatively small and is not scaled by the inverse of Ec/Ior. On the other hand, this degradation will not be mitigated by the equalizer in the MS.

Figure 7:
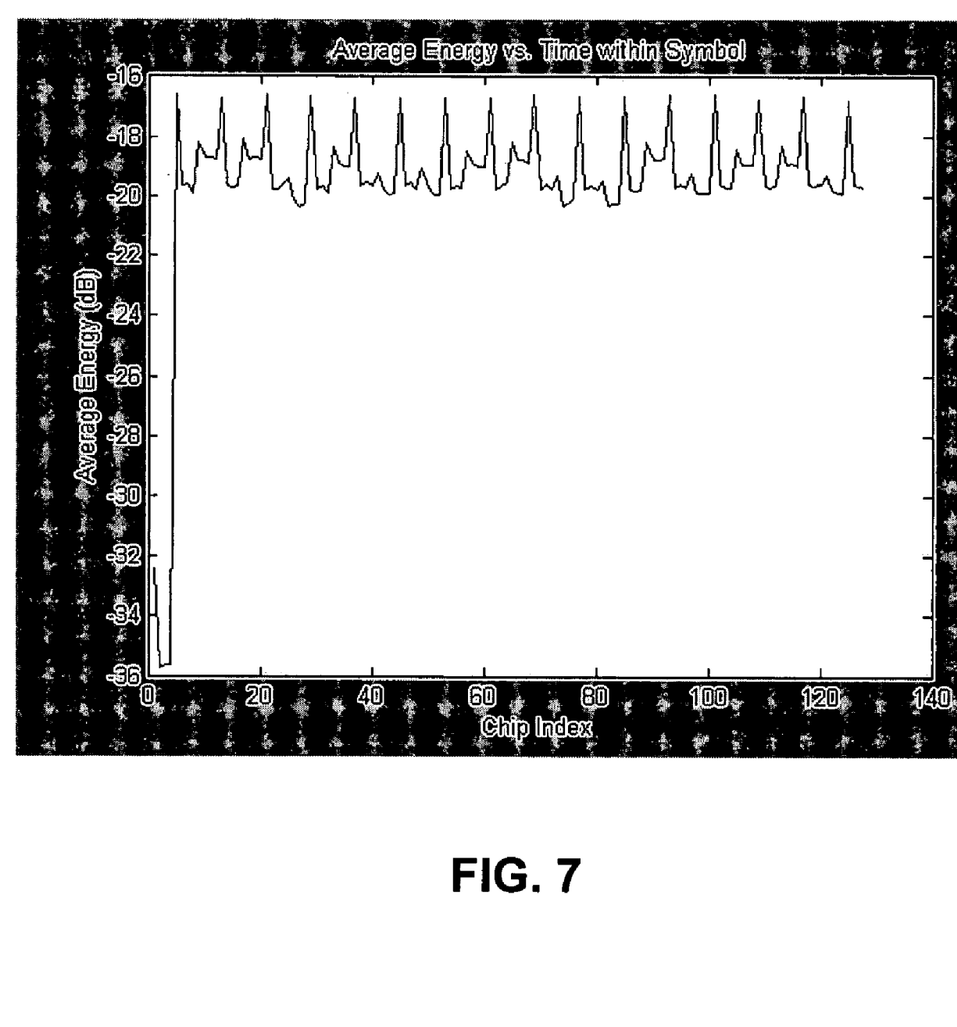
Figure 8:
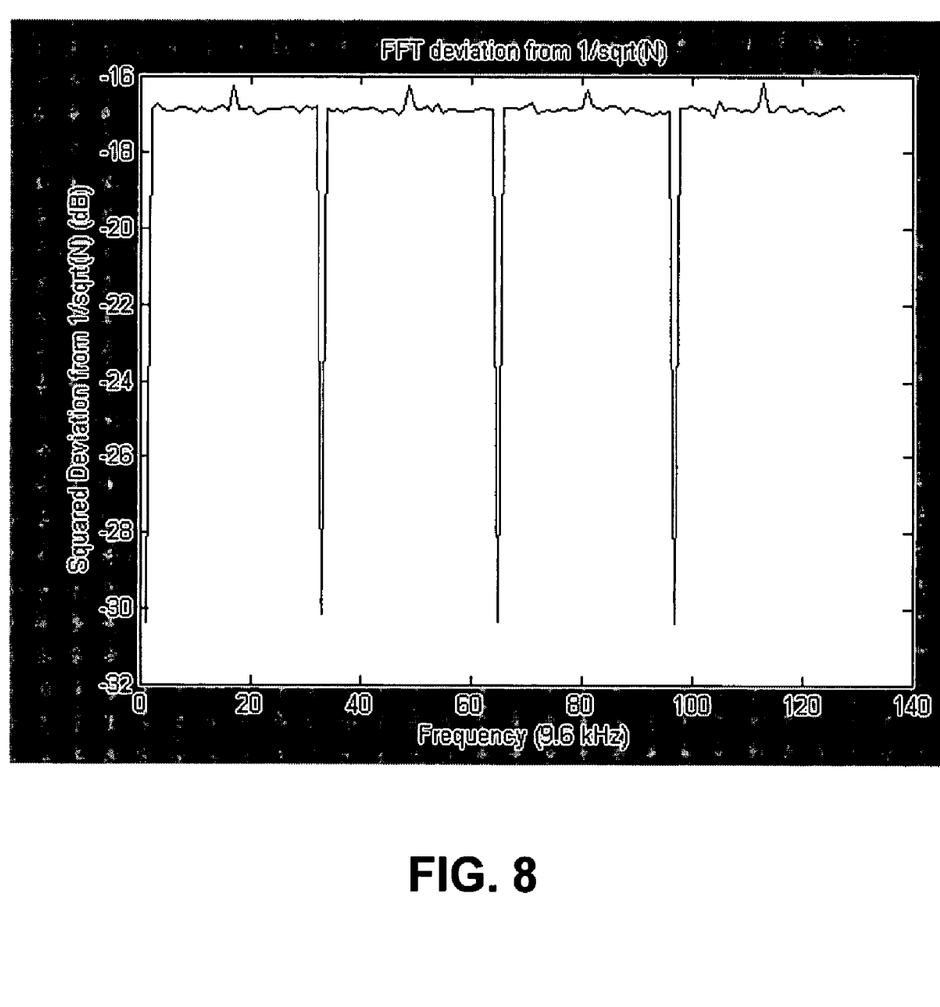

FIG. 8 illustrates the average energy of the chips within the $W_{128}$ symbols. Ideally, the first m chips would have zero energy to achieve the unique word insertion. FIG. 7 shows that the prefix energy is about 12 ... 16 dB below the average chip energy.

Figure 9:
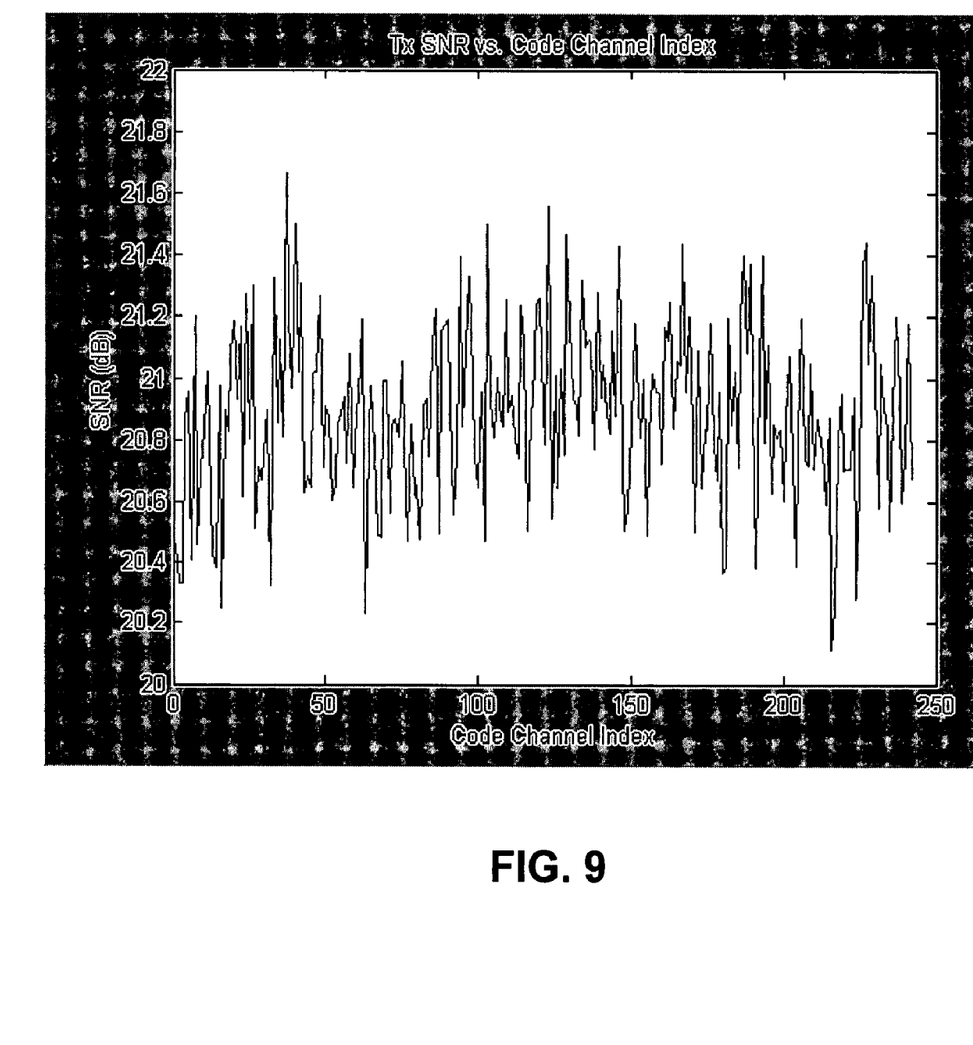

FIG. 9 illustrates the average squared difference between the target values of the spectrum and the achieved spectrum, i. e. the plot shows the value of $$E\left\{\left|\frac{1}{\sqrt{N}}FFT\{\underline{T}\} - \frac{1}{\sqrt{N}}\right|^2\right\} \quad \text{Eq. (9)}$$

By way of the simulated example, the power overhead was approximately 5.8%, which is slightly less than a similar OFDM overhead of 6.25%. It should also be noted that the present example did not include a 10% pilot overhead, which is incurred due to backward compatibility.

In yet another embodiment of the signal modifier 235, the base station supports frequency domain equalization in the forward link without CDMA air-interface changes and without creating an explicit cyclic prefix or unique word. Traditionally, Time Domain Equalizers (TDE) and Frequency Domain Equalizers (FDE) have been considered for CDMA systems. TDEs do not need a cyclic prefix but they may need infinite number of taps, at least in theory, in order to achieve optimum Signal-to-Noise Ratio (SNR), even with low delay spread channels. On the other hand, FDEs can always achieve optimum SNR with a finite circular convolution, but for this, we need the transmitted symbol itself to be circular, which requires the insertion of a cyclic prefix or unique word. If a cyclic prefix or unique word is not inserted in the transmitted signal then the performance of an FDE-based receiver will be negatively impacted. While the embodiment under discussion doesn't mitigate this impact, it can compensate for it by way of allowing for a better channel estimation.

In conventional equalizer solutions for both the TDE and FDE cases, problems are caused by the fact that in the channel estimation, the pilot signal cannot be observed without interference, because the pilot is not orthogonal to the other code channels in multipath cases before the equalization is performed. Integration across multiple time slots reduces pilot channel observation noise but also reduces the equalizer's capacity to adapt to high Doppler channels.

One theoretical approach to obtain better channel estimation, which results in a very high complexity solution, is to perform an exhaustive search to find propagation channel tap coefficients which in turn can be used to find equalizer filter tap coefficients. Such an approach assumes that the forward link (FL) channel delay spread is limited to m chips. The theoretical approach also assumes that the FL employs m pilot code channels, each with a known modulation. The receiver then would test, as channel hypotheses, all possible delay tap combinations restricted to a sufficiently fine grid. For example, assuming a 2×6 bit resolution covering both quadratures for each delay tap, there would be $2^{2 \times 6 \times m}$ hypotheses altogether. For each hypothesis, the MMSE equalizer's channel inversion filter coefficients could be determined for filtering the received signal. Next, for each hypothesis, the error between the m despread pilot symbols, after the channel inversion filtering is done, and the known pilot modulation symbols could be determined. The hypothesis, for which the average error is the smallest, could be selected as the best channel estimate, and the received signal could be filtered accordingly. Certainly the theoretical approach presented above could be used without changing the existing air-interface standard as long as m pilot code channels can be deployed, however, the receiver complexity is nontrivial.

By way of example, and not limitation, existing or legacy mobile stations may coexist in a communication system with other mobile stations that utilize frequency domain equalization when the forward link channel from the base station is modified in signal modifier 235 according to the following implementation. In the present embodiment and by way of example and not limitation, assumptions that the forward link channel delay spread is limited to m chips and 2m-2 code channels 409 (FIG. 4) are reserved in order to enhance the channel estimation in the receiver of the mobile station. These code channels do not carry data but are modulated by the base station in order to achieve desirable transmit waveform properties. As previously described with respect to the previous embodiment, (A) the first m chips of every symbol are set to '0'; and (B) there are m equally spaced values in the FFT of the transmitted signal that are each set to $\sqrt{I_{or}/N}$, where N (e.g., 128) is the symbol length used in the equalizer. In the previous embodiment, the existence of both assumptions (A) and (B) enabled proper frequency domain equalization operation in the mobile station as a result of the transmitted forward link signal from the base station. Accordingly, the frequency domain equalization proceeded in a similar manner to an OFDM approach up to the point of determining a channel frequency response estimate in every frequency bin followed by an MMSE frequency response inversion of the spectrum of the received signal with the resulting spectrum transformed back to the time domain for dispreading by the FHT.

In the present embodiment, the assumption (A) for setting the first m chips of every symbol to '0' is eliminated and the assumption (B) is modified in order to generate a forward link signal for facilitating frequency domain equalization that does not include a cyclic prefix. Generally, the present embodiment modifies portions of the forward link signal including the pilot channel structure for facilitating frequency domain equalization in the mobile stations without rendering the forward link signal incompatible with legacy mobile stations.

In the present embodiment, a discrete chip ×1 representation of the transmit signal (i.e., pulse shaping ignored) is assumed with an N chip processing length. As with the previous embodiment, the present embodiment may also utilize Walsh code lengths shorter than N as well without a performance effect on the operation of the frequency domain equalizer. By way of example, the following notation is adopted as an exemplary expression of one implementation of the present embodiment. In the present embodiment, the following matrix and vector notation is defined:

H is the N×N Walsh code matrix, where the columns represent the Walsh codes.

$\underline{d}$ is the 128×1 modulation symbol vector, in which the last 2m elements are initially set to zero (but will be set to non-zero values after further processing)

S is the N×N diagonal scrambling matrix, whose diagonal elements represent the QPSK short PN code symbols.

$\underline{T}$ is the N×1 transmit signal, whose elements are the chip ×1 time samples.

Note that in one defined CDMA interface standard, namely the CDMA2000 interface standard, T may be determined as:

$$\underline{T} = SH\underline{d} \quad \text{Eq. (10)}$$

It is desired to find an offset vector A that satisfies the following condition:

$$G - (\underline{T} + \underline{A}) = \underline{0} \quad \text{Eq. (11)}$$

Where the (2m−2)-by-(2m−2) matrix G is obtained by deleting rows with indices m and 2m from the 2m-by-2m matrix G' defined below:

$$G' = \begin{bmatrix} 0 & 0 & \cdots & 0 & 0 & 0 & \cdots & 1 & 0 & 0 & \cdots & 1 & 0 & 0 & \cdots & 1 \\ 0 & 0 & \cdots & 0 & \vdots & \vdots & \ddots & \vdots & \vdots & \vdots & \ddots & \vdots & \vdots & \ddots & \vdots \\ \vdots & \vdots & \ddots & \vdots & 0 & 1 & \cdots & 0 & 0 & 1 & \cdots & 0 & 1 & \cdots & 0 \\ 0 & 0 & \cdots & 0 & 1 & 0 & \cdots & 0 & \cdots & \cdots & 1 & 0 & \cdots & 0 & 1 & 0 & \cdots & 0 \\ 0 & 0 & \cdots & 1 & 0 & 0 & \cdots & 1 & 0 & 0 & \cdots & 1 & 0 & 0 & \cdots & 0 \\ \vdots & \vdots & \ddots & \vdots & \vdots & \vdots & \ddots & \vdots & \vdots & \vdots & \ddots & \vdots & 0 & 0 & \cdots & 0 \\ 0 & 1 & \cdots & 0 & 0 & 1 & \cdots & 0 & 0 & 1 & \cdots & 0 & \vdots & \vdots & \ddots & \vdots \\ 1 & 0 & \cdots & 0 & 1 & 0 & \cdots & 0 & 1 & 0 & \cdots & 0 & 0 & 0 & \cdots & 0 \end{bmatrix} \quad \text{Eq. (12)}$$

Linear estimation is used to obtain the best possible $\underline{\Delta}$ by defining a diagonal weighing Matrix, W, which controls the permissible SNR degradation in each of the used Walsh channels, and the power overhead in the last 2m−2 unused Walsh channels. W is set as follows:

$$W_{n,n} = \begin{cases} |d_n|^{7/16} & \text{for } 1 \leq n \leq N - 2m + 2 \\ 1.3 & \text{for } N - 2m + 3 \leq n \leq N \end{cases} \quad \text{Eq. (13)}$$

The above assignment ensures that the SNR degradation is even across all Walsh channels regardless of their $E_c/I_{or}$ allocation. Note that if some Walsh channels, such as the pilot need to be protected more (or less) than others, then the corresponding value of W could be reduced (or increased) accordingly. Conversely, the value for other unused Walsh codes could be increased (or decreased).

A diagonal (2m−2)-by-(2m−2) weighting matrix U, is also defined which controls the allowed channel estimation error and with U set to $U_{n,n}=0.12$, for $1 \leq n \leq 2m-2$.

Then the optimum $\underline{\Delta}$ is estimated as:

$$\underline{\Delta} = W(Q^T Q + U)^{-1} Q^T \underline{v} \quad \text{Eq. (14)}$$

where Q=GW, and $\underline{v}$ is the 2m×1 'measurement' vector defined as $$\underline{v} = G \cdot \underline{T} \quad \text{Eq. (15)}$$

According to the present embodiment, the following assumptions were simulated, namely:
N=256
m=8
Pilot $E_c/I_{or}$=−10 dB
Sync $E_c/I_{or}$=−13 dB
Paging $E_c/I_{or}$=−13 dB
Traffic $E_c/I_{or}$(per traffic Walsh channel)=(1−Pilot−Sync−Paging)/(N−3−(2m−2))
Simulation run: 1000 symbols By way of example and not limitation, the simulation results according to the above assumptions are illustrated with respect to FIG. 9 and FIG. 10. Specifically, FIG. 9 shows the 'Transmit' SNR in each forward link (FL) code channel. Note that the degradation represented by this SNR is relatively small and is not scaled by the inverse of Ec/Ior. On the other hand, this degradation will not be mitigated by the equalizer in the mobile station.

Figure 10:
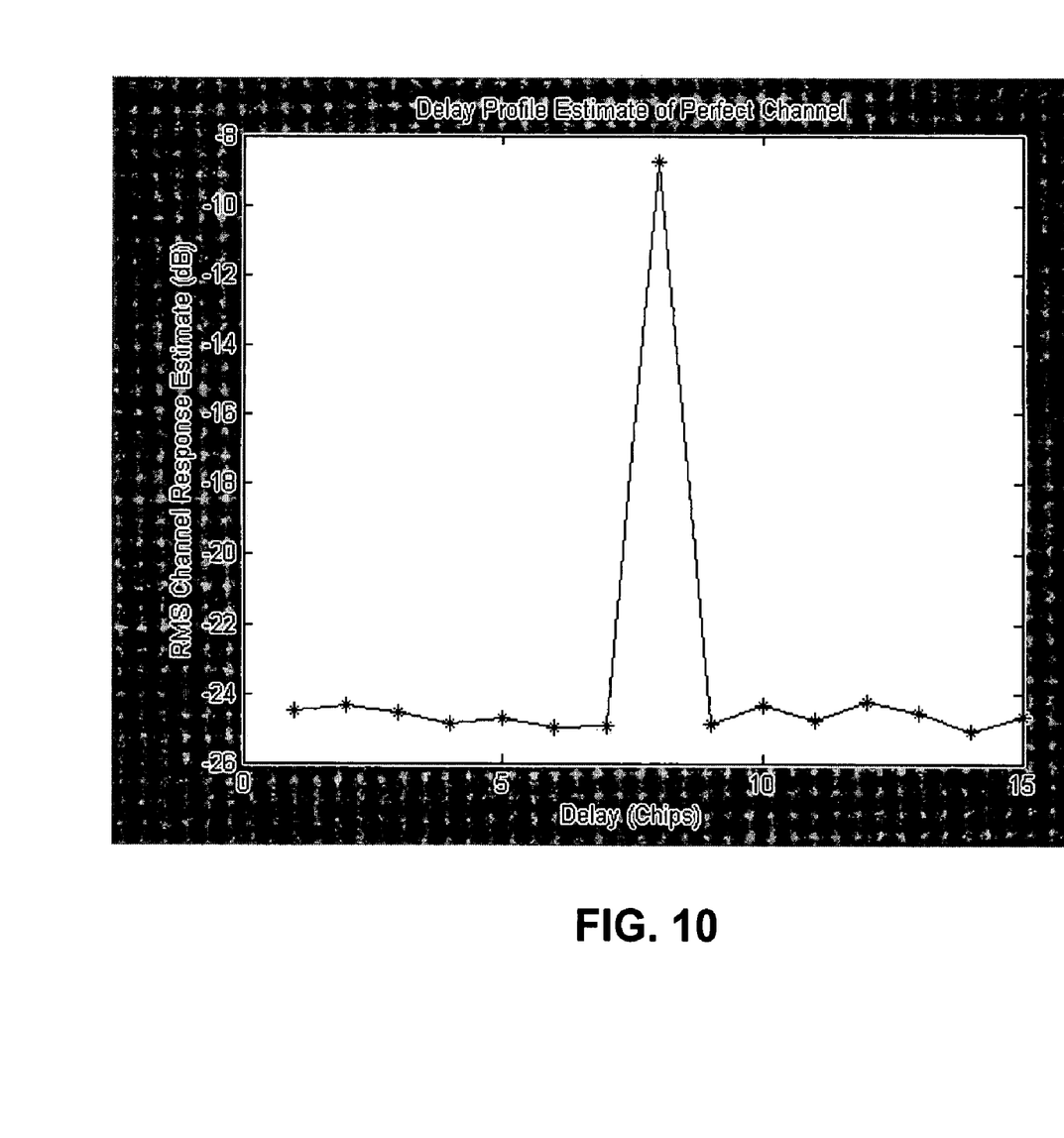

FIG. 10 shows the average delay profile estimate corresponding to a perfect channel. This was obtained by evaluating $G' \cdot (\underline{T} + \underline{\Delta})$. Note that only the positive (>8 chip in the figure) delay values would be actually measured (assuming that the receiver knows the timing of the first arriving path), however, the negative values would also be included in the estimate as noise. FIG. 10 shows that noise in the multipath estimate is about 16 dB below the channel tap coefficient. Note that in the simulations, the power overhead was 5%, which is slightly less than the equivalent OFDM overhead of 6.25%.

In yet a further embodiment of the present invention, the power of an unmodified pilot channel (e.g., pilot channel of IS-95 or cdma2000 standard) in the channel estimation. This is performed by chip ×1 fingers placed after the first arriving signal path. With the same methodology as described above with regard to Equations (9)-(14), the transmitted signal may be manipulated to appear multipath interference-free to the receiver of the mobile station.

This involves the following operation in the transmitter of the base station:
Step (TX-A) Encode, modulate, spread and scramble the composite transmit signal as in a legacy system
Step (TX-B) Identify unused time segments (chips) or unused Walsh codes, and identify a preferred power allocation cap for each of those
Step (TX-C) Determine allowable SNR degradation on Walsh codes or time segments that are currently used to carry data, control or pilot symbols
Step (TX-D) Determine the cross correlation of the composite transmitted signal (including the pilot) with the pilot signal, based on a given correlation period. (Ideally, this cross correlation would be zero anywhere outside of the zero time shift point.) In this determination, we can use the concatenation of past and future symbols beyond the correlation period in order to get a more accurate cross correlation estimate. The past samples are perfectly known to the transmitter, and the future samples can be well approximated.
Step (TX-E) Using the resources identified in step (TX-B) and step (TX-C), create a differential vector, which will be added to the transmitted signal, whose cross-correlation with the pilot has the same magnitude but opposite phase as the cross-correlation determined in step (TX-D). After this summation, the resulting composite signal should have the desired zero out-of-phase cross-correlation with the pilot within the given correlation period.
Step (TX-F) Transmit the sum 233 (FIG. 5), as summed by summer 229 (FIG. 5), of the vector 231 determined in step (TX-E) and the vector 228 determined in step (TX-A).

The receiver carries out the following operation:
Step (RX-A) Adjust timing to the estimated first arriving multipath
Step (RX-B) In the pilot filters, set the correlation period to be the same as used in step (TX-D) above.
Step (RX-C) Carry out demodulation, equalizer operation, etc. the same way as in a legacy system.

By way of example, the present embodiment enables a CDMA signal to be modified to include a similar pilot component to the pilot component of an OFDM signal. Such a comparison is more apparent by reference to FIG. 10 as compared to the matrix G' with $p(kT_c)$. For example, consider the case of a simple OFDM setup with no guardband, N chips per OFDM symbol and with m equally spaced pilot tones. Let's separate the pilot tones and the data part of the signal and do IFFT on the pilot tones only; let's call $p(kT_c)$ the result of the IFFT. Since the spectrum of the pilot tones was periodic, the time domain equivalent will also be periodic, with N/m evenly distributed peaks, spaced m chips apart.

$$p(kT_c) = \begin{cases} m \cdot \sqrt{E_p/N} & \text{if } k \bmod m = 0 \\ 0 & \text{otherwise} \end{cases} \quad k = 0, 1, \ldots, N-1 \quad \text{Eq. (16)}$$

Clearly, the time domain signal $p(kT_c)$ and any of its cyclic shifts are always orthogonal to the data portion of the transmitted OFDM symbol and any of those cyclic shifts. Then we can get an interference free estimate of the channel impulse response tap coefficients, c(j), j=0,1, . . . , m−1 by convolving $p(kT_c)$ with the received signal.

$$c = p(kT_c)^* r(lT_c) \quad \text{Eq. (17)}$$

The integration of the one or more of the various embodiments describe hereinabove do not significantly impact less capable or legacy receivers in a significant way. Mobile station receivers that don't use the same correlation period as assumed by the base station transmitter will not benefit from the multipath interference free pilot estimate, as described herein with reference to the various embodiments, but the performance in the mobile station receivers should be comparable to the legacy case. While the various described embodiments provide an improved performance for facilitating the utilization of frequency domain equalization in the receiver of the mobile station, there is an increased computational complexity that is performed in the base station prior to transmission.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for maintaining interoperation of one or more legacy mobile stations operable according to a first format while supporting one or more frequency domain equalization-capable mobile stations operable according to a second format, comprising:
    generating a first signal sequence according to a first format;
    generating an offset vector; and
    combining said first signal sequence with said offset vector to form a second signal sequence according to a second format, said second signal sequence of said second format supporting frequency domain equalization in one or more frequency domain-capable mobile stations, said second signal sequence maintaining compatibility with one or more legacy mobile stations.

2. The method of claim 1, further comprising setting a first m chips of every symbol in said first signal sequence to zero.

3. The method of claim 1, further comprising setting m equally spaced values in an FFT of the second format to a known value.

4. The method of claim 3, wherein the known value is $\sqrt{I_{or}/N}$, where N is the symbol length used in the frequency domain equalized mobile stations and $I_{or}$ is the total transmit power of the base station sector.

5. The method of claim 1, wherein said generating an offset vector comprises creating a differential vector for summing with the first format, the differential vector having a cross-correlation with a pilot channel of a same magnitude but opposite phase as a cross correlation of said second signal sequence and the pilot channel.

6. The method of claim 1, further comprising transmitting said second signal sequence for operability of both said one or more legacy mobile stations and said second one or more frequency domain equalization-capable mobile stations.

7. A base station, comprising:
    an encoder for encoding a plurality of message data bits into a plurality of code symbols;
    a signal modifier configured to generate a first signal sequence according to a first format and generate an offset vector; and
    a summer for combining said first signal sequence with said offset vector to form a second signal sequence according to a second format, said second signal sequence of said second format supporting frequency domain equalization in one or more frequency domain-capable mobile stations, said second signal sequence maintaining compatibility with one or more legacy mobile stations.

8. The base station of claim 7, wherein said signal modifier is further configured to set a first m chips of every symbol in said first signal sequence to zero.

9. The base station of claim 7, wherein said signal modifier is further configured to set m equally spaced values in an FFT of the second format to a known value.

10. The base station of claim 9, wherein the known value is $\sqrt{I_{or}/N}$, where N is the symbol length used in the frequency domain equalized mobile stations and $I_{or}$ is the total transmit power of the base station sector.

11. The base station of claim 7, wherein said signal modifier is configured to generate said offset vector as a result of creating a differential vector for summing with the first format, the differential vector having a cross-correlation with a pilot channel of a same magnitude but opposite phase as a cross correlation of said second signal sequence and said pilot channel.

12. The base station of claim 7, further including a transmitter configured to transmit said second signal sequence for operability of both said one or more legacy mobile stations and said one or more frequency domain equalization-capable mobile stations.

13. A wireless communication system comprising:
    a one or more non-frequency domain equalization-capable mobile stations configured to operate according to a first format;
    a second one or more frequency domain equalization-capable mobile stations configured to operate according to a second format; and
    a base station configured for maintaining interoperation of one or more non-frequency domain equalization-capable mobile stations operable according to a first format while supporting one or more frequency domain equalization-capable mobile stations operable according to a second format.

14. The wireless communication system of claim 13, wherein said base station comprises:
    an encoder for encoding a plurality of message data bits into a plurality of code symbols;
    a signal modifier configured to generate a first signal sequence according to a first format and generate an offset vector; and
    a summer for combining said first signal sequence with said offset vector to form a second signal sequence according to a second format, said second signal sequence of said second format supporting frequency domain equalization in one or more frequency domain-capable mobile stations, said second signal sequence maintaining compatibility with one or more non-frequency domain-capable mobile stations.

15. The wireless communication system of claim 14, wherein said signal modifier is further configured to set a first m chips of every symbol in said first signal sequence to a known value.

16. The wireless communication system of claim 14, wherein said signal modifier is further configured to set m equally spaced values in an FFT of the second format to $\sqrt{I_{or}/N}$, where N is the symbol length used in the frequency domain equalized mobile stations and $I_{or}$ is the total transmit power of the base station sector.

17. The wireless communication system of claim 14, wherein said signal modifier is configured to generate said offset vector as a result of creating a differential vector for summing with the first format, the differential vector having a cross-correlation with a pilot channel of a same magnitude but opposite phase as a cross correlation of said second signal sequence and said pilot channel.

18. The wireless communication system of claim 14, further including a transmitter configured to transmit said second signal sequence for operability of both said one or more legacy mobile stations and said one or more frequency domain equalization-capable mobile stations.

19. An apparatus for maintaining interoperation of one or more legacy mobile stations operable according to a first format while supporting one or more frequency domain-capable mobile stations operable according to a second format, comprising:

means for generating a first signal sequence according to a first format;

means for generating an offset vector; and means for combining said first signal sequence with said offset vector to form a second signal sequence according to a second format, said second signal sequence of said second format supporting frequency domain equalization in one or more frequency domain-capable mobile stations, said second signal sequence maintaining compatibility with one or more legacy mobile stations.

20. The apparatus of claim 19, further comprising a means for setting a first m chips of every symbol in said first signal sequence to zero.

21. The apparatus of claim 19, further comprising a means for setting m equally spaced values in an FFT of the second format to $\sqrt{I_{or}/N}$, where N is the symbol length used in the frequency domain equalized mobile stations and $I_{or}$ is the total transmit power of the base station sector.

22. The apparatus of claim 19, wherein said means for generating an offset vector comprises creating a differential vector for summing with the first format, the differential vector having a cross-correlation with a pilot channel of a same magnitude but opposite phase as a cross correlation of said second signal sequence and the pilot channel.

23. The apparatus of claim 19, further comprising means for transmitting said second signal sequence for operability of both said one or more legacy mobile stations and said second one or more frequency domain equalization-capable mobile stations.

* * * * *

UNITED STATES PATENT AND TRADEMARK OFFICE
CERTIFICATE OF CORRECTION

PATENT NO.         : 7,590,169 B2                                            Page 1 of 1
APPLICATION NO.    : 11/349388
DATED              : September 15, 2009
INVENTOR(S)        : Gaal It is certified that error appears in the above-identified patent and that said Letters Patent is hereby corrected as shown below:

Column 18, line 37, claim 13: "a first format" to read as --the first format--

Column 18, line 40, claim 13: "a first format" to read as --the first format--

Column 18, line 46, claim 14: "a first format" to read as --the first format--

Signed and Sealed this
Twenty-eighth Day of June, 2011

David J. Kappos
*Director of the United States Patent and Trademark Office*